US012761429B2

(12) United States Patent
Shimada et al.

(10) Patent No.: US 12,761,429 B2
(45) Date of Patent: Oct. 13, 2026

(54) OPTICAL MODULE AND OPTICAL CONNECTOR CABLE

(71) Applicant: SUMITOMO ELECTRIC INDUSTRIES, LTD., Osaka (JP)

(72) Inventors: Kensaku Shimada, Osaka (JP); Takeshi Inoue, Osaka (JP); Takuya Ishida, Osaka (JP); Tatsuhiko Naito, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 316 days.

(21) Appl. No.: 18/579,963

(22) PCT Filed: Jul. 5, 2022

(86) PCT No.: PCT/JP2022/026759

§ 371 (c)(1),
(2) Date: Jan. 17, 2024

(87) PCT Pub. No.: WO2023/013349

PCT Pub. Date: Feb. 9, 2023

(65) Prior Publication Data

US 2024/0337797 A1 Oct. 10, 2024

(30) Foreign Application Priority Data

Aug. 5, 2021 (JP) ................................ 2021-128962

(51) Int. Cl.
*G02B 6/42* (2006.01)
*G02B 6/32* (2006.01)

(52) U.S. Cl.
CPC ........... *G02B 6/4239* (2013.01); *G02B 6/322* (2013.01); *G02B 6/4214* (2013.01); *G02B 6/425* (2013.01)

(58) Field of Classification Search
CPC .... G02B 6/4239; G02B 6/322; G02B 6/4214; G02B 6/425
(Continued)

(56) References Cited

U.S. PATENT DOCUMENTS 6,526,204 B1 2/2003 Sherrer et al.
2014/0140657 A1 5/2014 Shiraishi
(Continued)

FOREIGN PATENT DOCUMENTS

CN 104133271 A 11/2014
CN 104169767 A 11/2014
(Continued)

*Primary Examiner* — Jerry M Blevins
(74) *Attorney, Agent, or Firm* — Oliff PLC

(57) ABSTRACT

An optical module includes a substrate, an optical element, and a lens module. The optical element is mounted on the substrate. The lens module includes an outer surface and an inner surface facing each other and a lens provided on the inner surface so as to be optically coupled to the optical element and optically couples an optical fiber with the optical element through the lens. The lens module is mounted on the substrate such that the inner surface faces the substrate and is attached to the substrate with an adhesive introduced into a gap between the inner surface and the substrate. The optical module is provided with an inflow prevention structure that prevents inflow of the adhesive to an optical axis of the lens between the substrate and the lens module and between the lens and the adhesive.

14 Claims, 15 Drawing Sheets

(58) Field of Classification Search
USPC .............................................................. 385/33
See application file for complete search history.

(56) References Cited

U.S. PATENT DOCUMENTS

| | | | | |
|---|---|---|---|---|
| 2014/0147085 | A1* | 5/2014 | Lim ..................... | G02B 6/4249 29/831 |
| 2014/0270662 | A1* | 9/2014 | Morioka .............. | G02B 6/4204 385/93 |
| 2015/0010273 | A1 | 1/2015 | Oyagi et al. | |
| 2018/0031772 | A1* | 2/2018 | Akabane .............. | G02B 6/4204 |
| 2019/0129106 | A1 | 5/2019 | Inoue et al. | |
| 2020/0018911 | A1 | 1/2020 | Mori | |
| 2022/0091339 | A1 | 3/2022 | Hirabayashi et al. | |

FOREIGN PATENT DOCUMENTS

| | | | |
|---|---|---|---|
| JP | 2010-122311 | A | 6/2010 |
| JP | 2010-271444 | A | 12/2010 |
| JP | 2014-102399 | A | 6/2014 |
| JP | 2019-082508 | A | 5/2019 |
| JP | 2020-008813 | A | 1/2020 |
| WO | 2019/150914 | A1 | 8/2019 |
| WO | 2020/149278 | A1 | 7/2020 |

* cited by examiner

OPTICAL MODULE AND OPTICAL CONNECTOR CABLE

TECHNICAL FIELD

The present disclosure relates to an optical module and an optical connector cable. The present application claims the priority based on Japanese Patent Application No. 2021-128962, filed on Aug. 5, 2021, the entire content of which is incorporated herein by reference.

BACKGROUND ART

Patent Literature 1 discloses an example of an optical component (optical module) optically connecting an optical fiber to a photoelectric conversion element (optical element) mounted on a substrate. This optical component converts light emitted from the optical fiber in a horizontal direction into light propagated in a vertical direction using a lens component and causes this light to be incident on the photoelectric conversion element mounted on the substrate.

CITATION LIST

Patent Literature

[Patent Literature 1] Japanese Unexamined Patent Publication No. 2019-082508

SUMMARY OF INVENTION

Technical Problem

An optical module of the present disclosure includes a substrate, an optical element, and a lens module. The optical element is mounted on the substrate. The lens module includes an outer surface and an inner surface facing each other, and a lens provided on the inner surface so as to be optically coupled to the optical element, and optically couples an optical fiber with the optical element through the lens. The lens module is mounted on the substrate such that the inner surface faces the substrate and is attached to the substrate with an adhesive introduced into a gap between the inner surface and the substrate. An inflow prevention structure that prevents inflow of the adhesive to an optical axis of the lens is provided between the substrate and the lens module and between the lens and the adhesive.

An optical connector cable of the present disclosure includes the optical module described above, and an optical fiber cable. The optical fiber cable includes at least one optical fiber. In this optical connector cable, the optical fiber cable is attached to the optical module such that the optical fiber is optically coupled to the optical element through the lens.

DESCRIPTION OF EMBODIMENT

Figure 1:
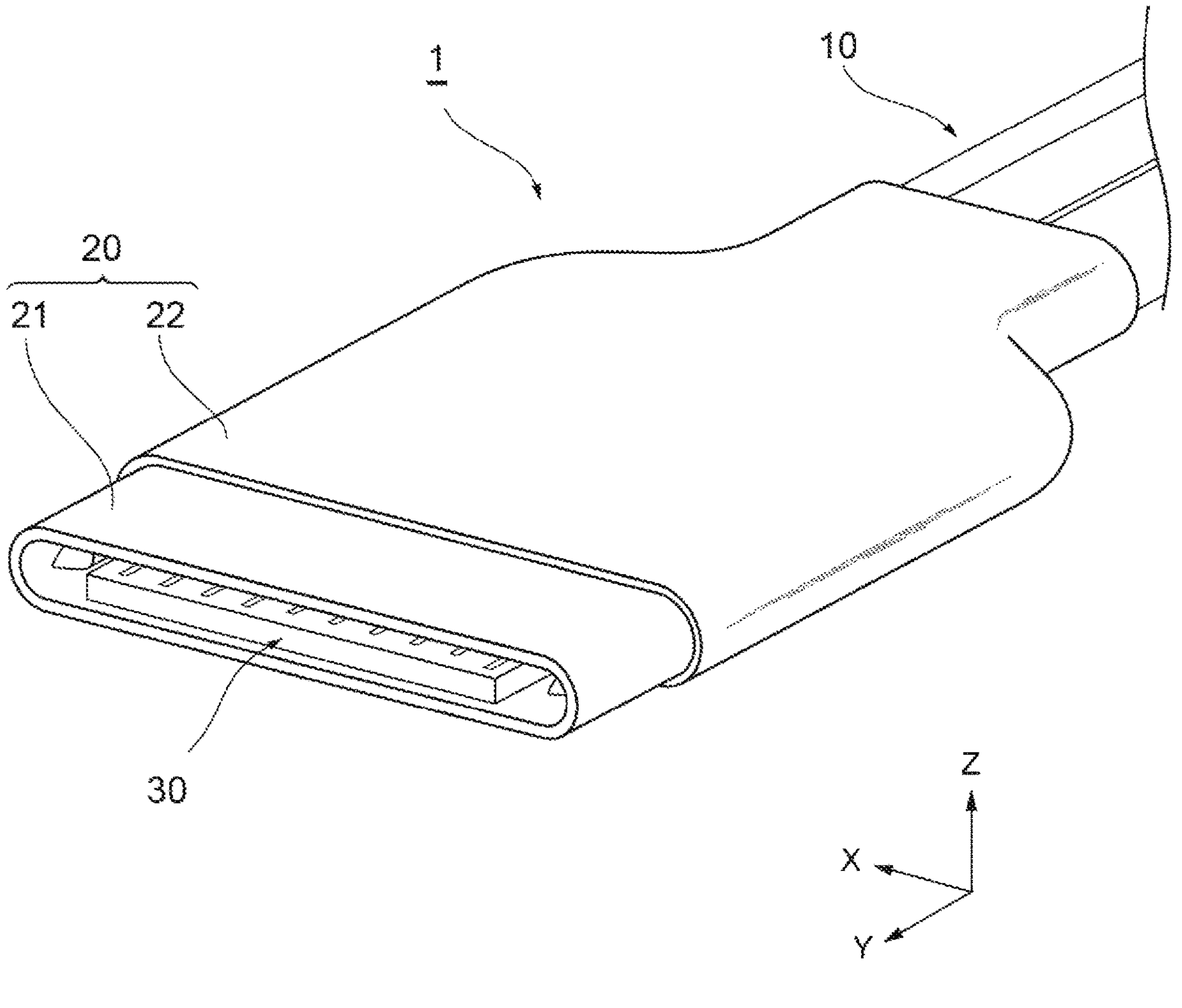
FIG. 1 is a perspective view illustrating an optical connector cable according to an embodiment.

Problem to be Solved by Present Disclosure

Optical modules in the related art optically connect an optical fiber with an optical element through a lens provided on an inner surface of an optical module. In such optical modules, when a lens module is mounted on a substrate, an adhesive is introduced between the substrate and the lens module and both are fixed to each other. However, as optical modules become thinner, a gap between the substrate and the lens module has become so small that it has become difficult to control spread of an adhesive which has been introduced into the gap. For this reason, a part of the adhesive may flow into an area close to the lens provided on an inward side on an inner surface of the lens module and may obstruct an optical path of the lens for optical coupling between the optical fiber and the optical element.

An object of the present disclosure is to provide an optical module and an optical connector cable, in which obstruction to an optical path of a lens is prevented and optical coupling between an optical fiber and an optical element can be stably performed.

Effects of Present Disclosure

According to the present disclosure, it is possible to stably perform optical coupling between an optical fiber and an optical element.

Description of Embodiment of Present Disclosure

First, details of an embodiment of the present disclosure will be enumerated and described. An optical module according to an embodiment includes a substrate, an optical element, and a lens module. The optical element is mounted on the substrate. The lens module includes an outer surface and an inner surface facing each other and a lens provided on the inner surface so as to be optically coupled to the optical element, and optically couples an optical fiber with the optical element through the lens. The lens module is mounted on the substrate such that the inner surface faces the substrate and is attached to the substrate with an adhesive introduced into a gap between the inner surface and the substrate. An inflow prevention structure that prevents inflow of the adhesive to an optical axis of the lens is provided between the substrate and the lens module and between the lens and the adhesive.

In this optical module, the inflow prevention structure that prevents inflow of the adhesive to the optical axis of the lens is provided between the substrate and the lens module and between the lens and the adhesive. Due to this inflow prevention structure, the adhesive which has been introduced into the gap between the lens module and the substrate is prevented from flowing into the lens provided on the inner surface of the lens module so that the adhesive does not obstruct an optical path of the lens for optical coupling between the optical fiber and the optical element. Thus, according to this optical module, optical coupling between the optical fiber and the optical element can be stably performed.

As one embodiment, the inflow prevention structure may include a groove or a recessed portion provided on a surface of the substrate facing the lens module and close to a region facing the lens. According to this aspect, the adhesive which has been introduced into the gap between the substrate and the lens module can be prevented from flowing into the optical axis of the lens by a simple constitution. Thus, according to this optical module, optical coupling between the optical fiber and the optical element can be stably performed by a simple constitution. Here, being close to a region is intended to include not only a region facing the lens but also a region between this region facing it and the adhesive. The groove or the recessed portion serving as the inflow prevention structure may extend in a width direction intersecting a longitudinal direction in a surface direction of the substrate or may extend to an outward side in the width direction.

As one embodiment, the inflow prevention structure may include a wall provided on the inner surface of the lens module and between the lens and the adhesive. According to this aspect, the adhesive which has been introduced into the gap between the substrate and the lens module can be prevented from flowing into the optical axis of the lens by a simple constitution. Thus, according to this optical module, optical coupling between the optical fiber and the optical element can be stably performed by a simple constitution. The wall serving as the inflow prevention structure may extend in the width direction intersecting the longitudinal direction in the surface direction of the lens module or may extend to the outward side in the width direction. This wall may abut the substrate when the lens module is attached to the substrate using the adhesive. Accordingly, inflow of the adhesive can be prevented more reliably.

As one embodiment, the inflow prevention structure may include a guide groove provided on the inner surface of the lens module and between the lens and the adhesive. According to this aspect, the adhesive which has been introduced into the gap between the substrate and the lens module can be prevented from flowing into the optical axis of the lens by a simple constitution. Thus, according to this optical module, optical coupling between the optical fiber and the optical element can be stably performed by a simple constitution. The guide groove serving as the inflow prevention structure may extend in the width direction intersecting the longitudinal direction in the surface direction of the lens module or may extend to the outward side in the width direction. The inflow prevention structure may be a structure in which any two or three of the groove or the recessed portion, the wall, and the guide groove described above are combined.

As one embodiment, a width of the gap between the substrate and the inner surface of the lens module may be equal to or less than 1 mm, and the adhesive may be introduced into this gap. According to this aspect, the substrate and the lens module are attached to each other in a thinner manner, and therefore the optical module can be made thin. If an adhesive is introduced into such a very small gap, there is concern that the adhesive easily reaches the inside. However, since the inflow prevention structure is provided in the optical module according to the present embodiment, the adhesive is prevented from adhering on the optical axis of the lens, and therefore optical coupling between the optical fiber and the optical element can be stably performed.

As one embodiment, the inflow prevention structure may be provided in a region within 5 mm from the optical axis of the lens in a surface direction orthogonal to the optical axis. According to this aspect, while the amount of adhesive introduced between the substrate and the lens module is sufficiently secured, the lens module can be attached to the substrate more reliably.

As one embodiment, the inflow prevention structure may include a first inflow prevention structure and a second inflow prevention structure. The first inflow prevention structure may be disposed on one side of the lens, and the second inflow prevention structure may be disposed on the other side of the lens. According to this aspect, any adhesive introduced into one side and the other side of the lens between the substrate and the lens module can be prevented from flowing into a region of the optical axis of the lens. Thus, according to this optical module, optical coupling between the optical fiber and the optical element can be more stably performed.

As one embodiment, a cavity recessed from a first surface of the substrate toward a second surface of the substrate so as to have a bottom portion may be formed in the substrate, and at least a part of the lens module may be accommodated in the cavity. The cavity may include a first cavity and a second cavity having a second bottom portion positioned closer to the second surface than a first bottom portion of the first cavity. The lens may be accommodated in the second cavity. In this case, the optical module can be made thinner more reliably. In this embodiment, the inflow prevention structure may be accommodated in the second cavity.

As one embodiment, the lens module may include a mirror converting a propagation direction of light such that light emitted from the optical fiber mounted on the outer surface is incident on the optical element or light emitted from the optical element is incident on the optical fiber mounted on the outer surface. According to this aspect, the optical fiber positioned along the substrate and the optical element positioned with the substrate interposed therebetween with respect to the optical fiber can be optically coupled using the mirror.

An optical connector cable according to one embodiment includes any one of the optical modules described above, and an optical fiber cable. The optical fiber cable includes at least one optical fiber. In this optical connector cable, the optical fiber cable is attached to the optical module such that the optical fiber is optically coupled to the optical element through the lens.

In this optical connector cable, the inflow prevention structure that prevents inflow of the adhesive to the optical axis of the lens is provided between the substrate and the lens module and between the lens and the adhesive. According to this aspect, the adhesive which has been introduced into the gap between the substrate and the lens module can be prevented from flowing into the lens provided on the inner surface of the lens module. Thus, according to this optical connector cable, optical coupling between the optical fiber and the optical element can be stably performed.

Details of Embodiment of Present Disclosure

Specific examples of an optical module and an optical connector cable according to the present disclosure will be described below with reference to the drawings. The present invention is not limited to these examples, and is indicated by the claims, and it is intended to include all the changes within the meaning and the scope equivalent to the claims. The same reference signs will be applied to the same elements in description of the drawings, and duplicate description thereof will be omitted.

Figure 2:
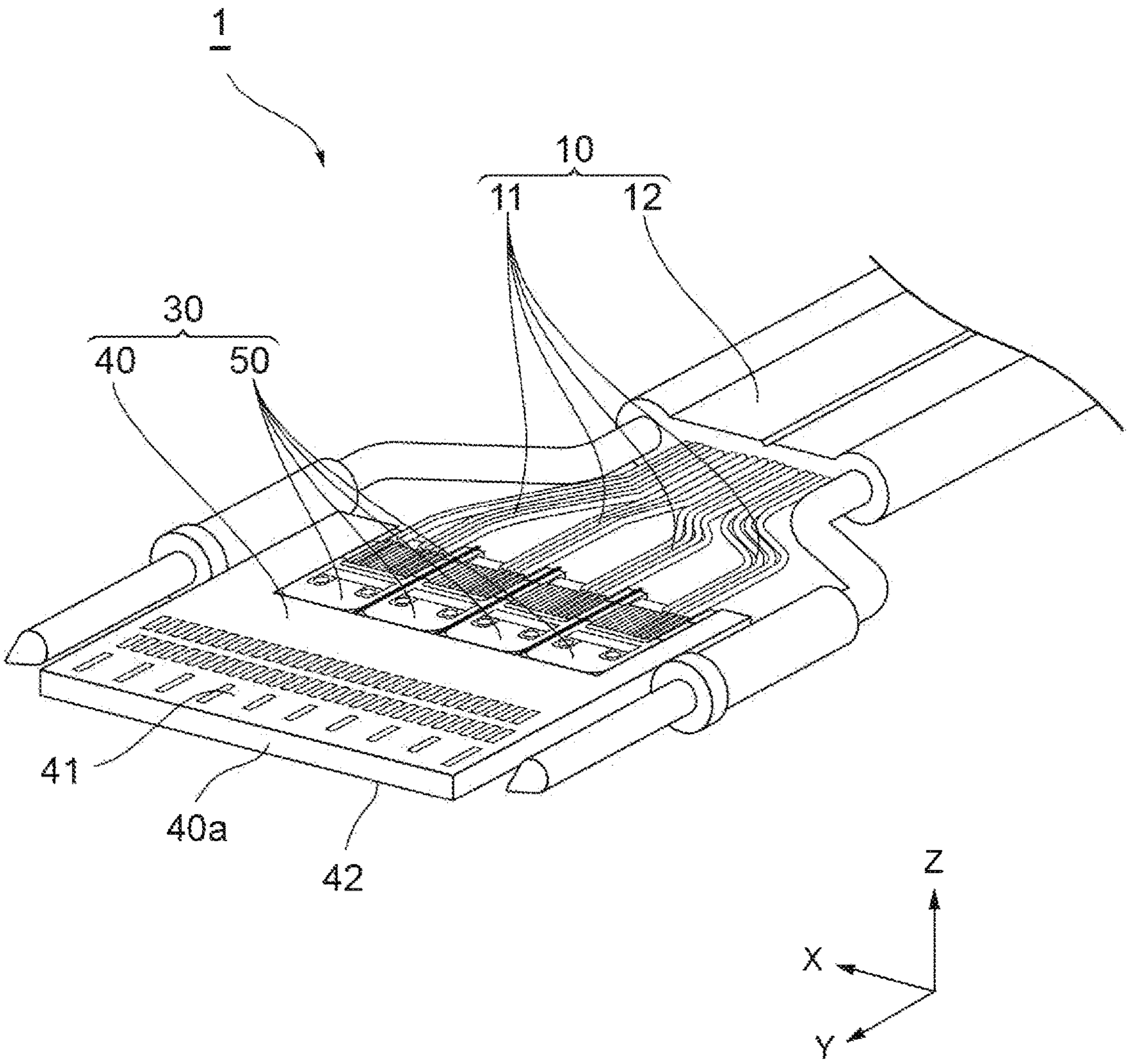
FIG. 2 is a perspective view illustrating the optical connector cable from which a protective member is removed.

With reference to FIGS. 1 and 2, an optical connector cable 1 according to an embodiment will be described. FIG. 1 is a perspective view illustrating the optical connector cable 1 according to the embodiment. FIG. 2 is a perspective view illustrating the optical connector cable 1 from which a protective member 20 is removed. Hereinafter, for the sake of description, a width direction of an end portion of the optical connector cable 1 will be regarded as a direction X, an extension direction of the end portion will be regarded as a direction Y, and a thickness direction of the end portion will be regarded as a direction Z. In the present embodiment, the direction X, the direction Y, and the direction Z are orthogonal to each other.

The optical connector cable 1 is a cable, for example, used when optical signals are transmitted and received between devices. As illustrated in FIGS. 1 and 2, the optical connector cable 1 includes an optical fiber cable 10, the protective member 20, and an optical module 30. In FIGS. 1 and 2, one end of the optical fiber cable 10 is illustrated. However, the other end of the optical fiber cable 10 may also have a similar constitution.

As illustrated in FIG. 2, the optical fiber cable 10 has a plurality of optical fibers 11 and a cable sheath 12. Each of the optical fibers 11 is a member for transmitting optical signals. In each of the optical fibers 11, a great part thereof is accommodated inside the cable sheath 12, and a tip part is exposed to the outside of the cable sheath 12. The plurality of optical fibers 11 are disposed side by side in the direction X in a one-dimensional manner. Inside the cable sheath 12, all the optical fibers 11 are accommodated close to each other in a bundle. Meanwhile, outside the cable sheath 12, the plurality of optical fibers 11 branch into several (in the present embodiment, four to six) bundles, and an end portion of each of the bundles is held by each lens module 50. For example, each of the optical fibers 11 may be formed by coating a glass fiber constituted of a core and a cladding surrounding the core with a resin. Each of the optical fibers 11 may be a single-mode optical fiber (SMF) or a multi-mode optical fiber (MMF).

As illustrated in FIG. 1, the protective member 20 is a member exhibiting a flat shape extending in the direction X and the direction Y and is capable of accommodating the optical module 30 therein. The protective member 20 protects the optical module 30 from an external impact. The protective member 20 has a laminated structure constituted of an inner layer 21 and an outer layer 22 covering the inner layer 21. For example, a material of the inner layer 21 may be a metal. A material of the outer layer 22 may be a resin, for example. At a tip of the optical connector cable 1, a part of the inner layer 21 is exposed from the outer layer 22. For example, this exposed part is inserted into a socket provided in a device to which the optical connector cable 1 is connected.

Figure 3:
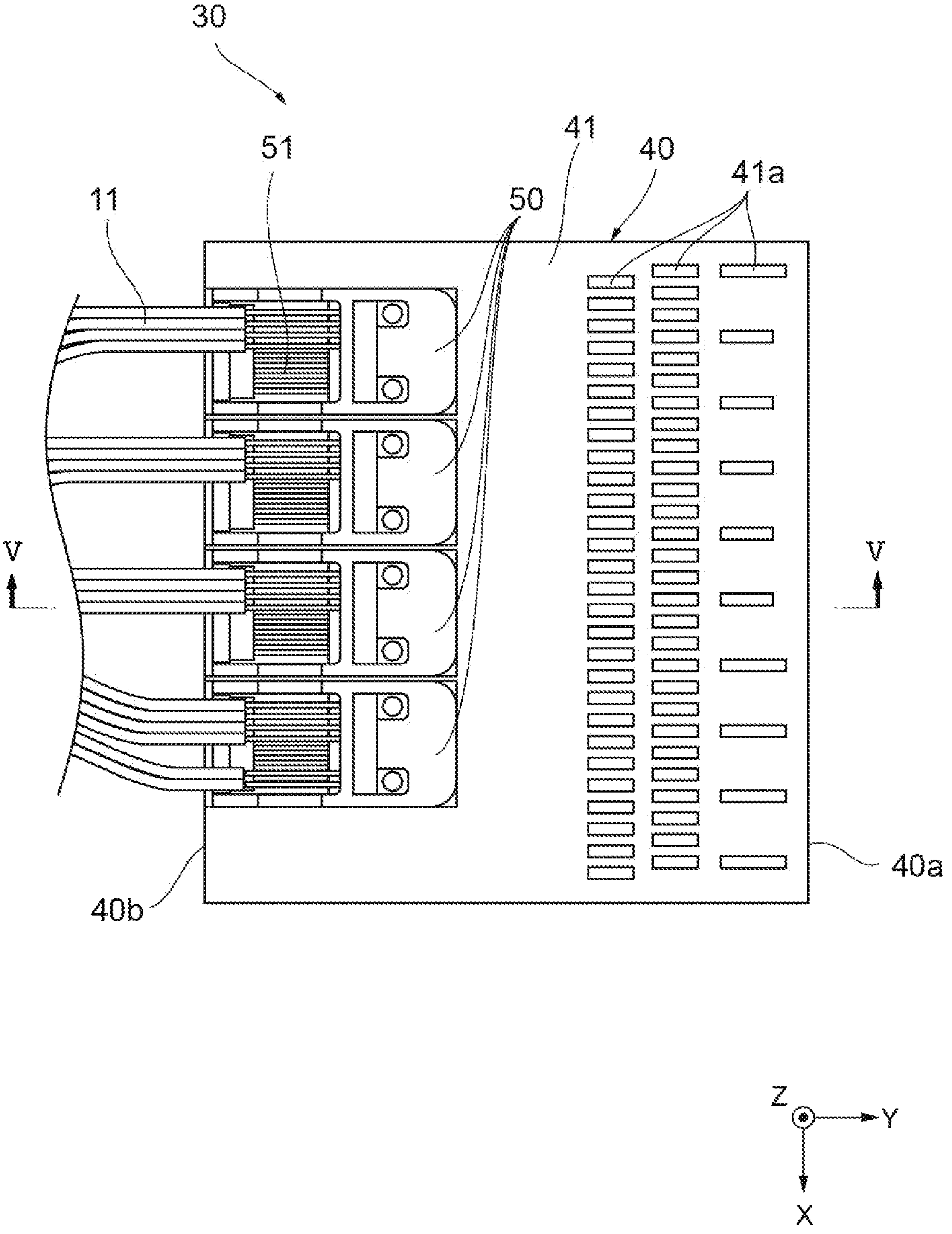
FIG. 3 is a plan view of an optical module viewed from above a first surface of a substrate.
Figure 4:
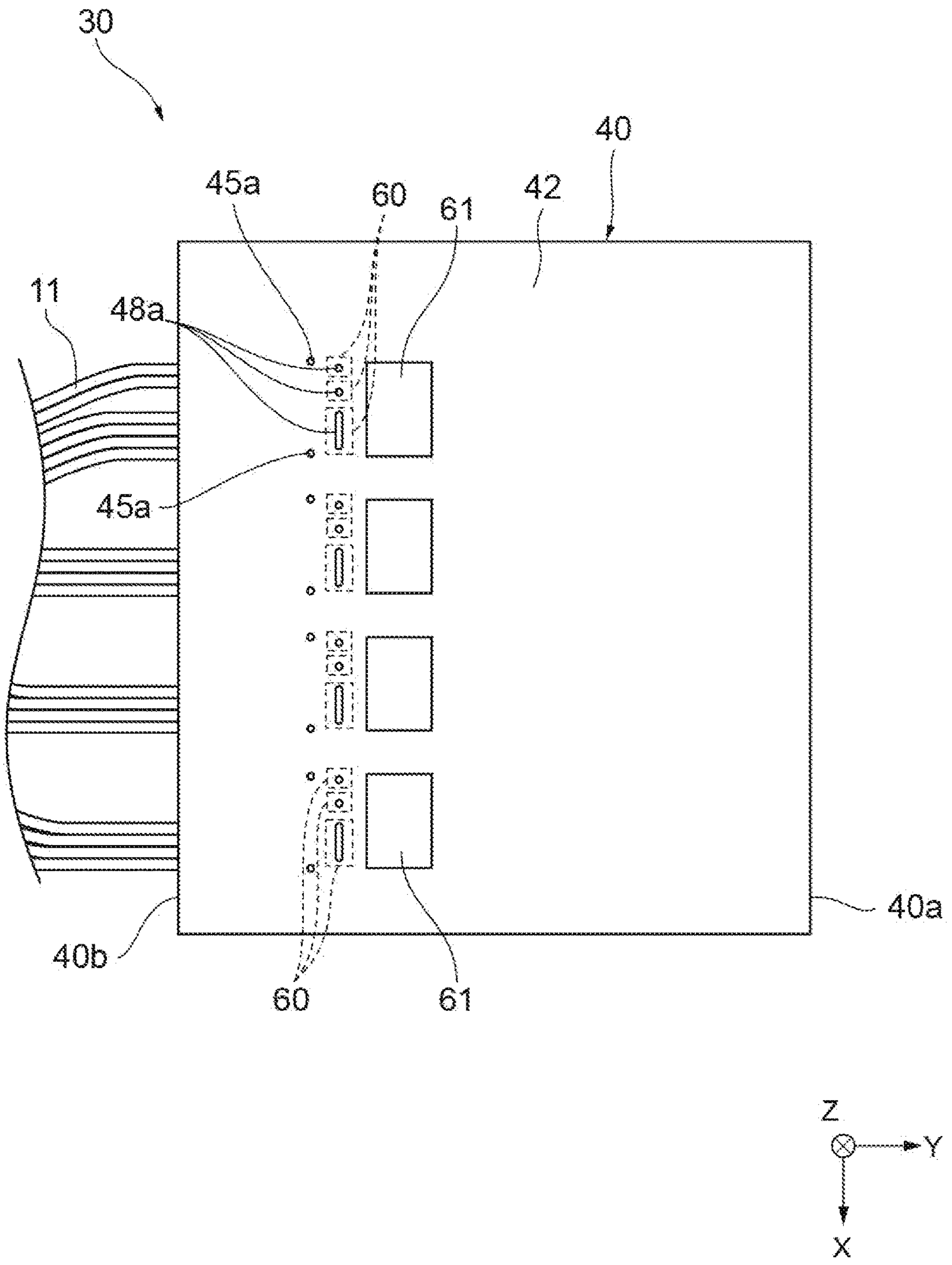
FIG. 4 is a plan view of the optical module viewed from above a second surface of the substrate.
Figure 5:
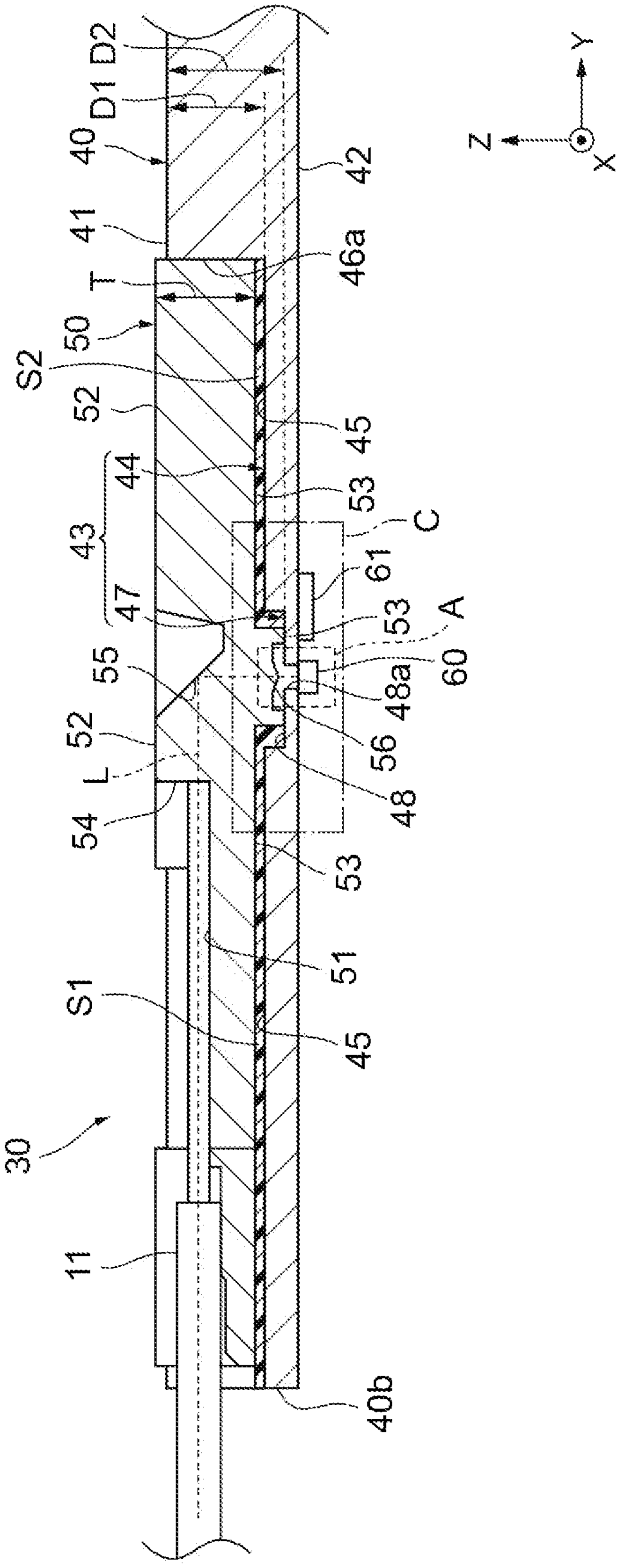
FIG. 5 is a cross-sectional view when the optical module is cut along line V-V indicated in FIG. 3.
Figure 6:
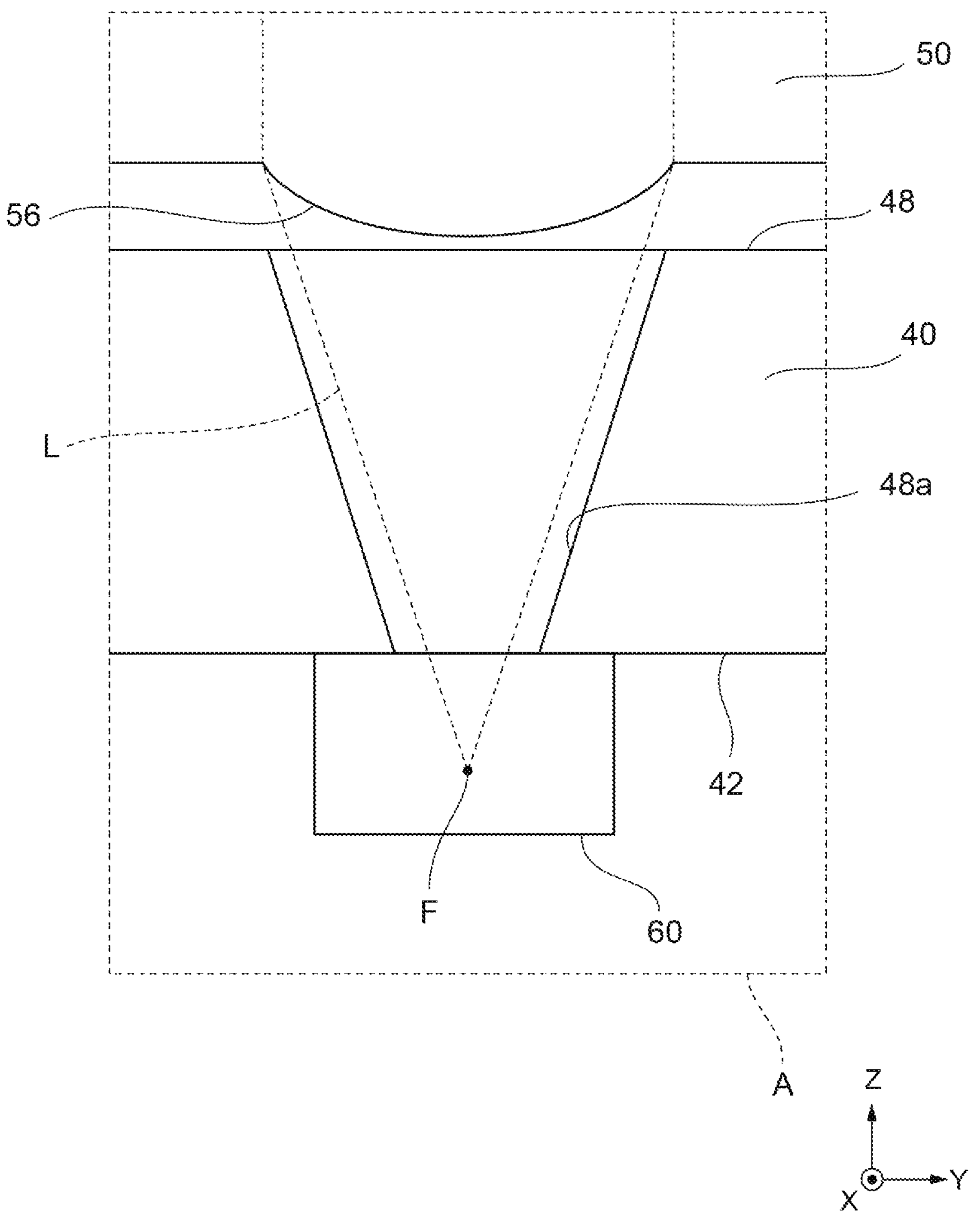
FIG. 6 is an enlarged view of a part surrounded by a dotted line A indicated in FIG. 5.

Next, the optical module 30 will be described with reference to FIGS. 3 to 6. FIG. 3 is a plan view of the optical module 30 viewed from above a first surface 41 of a substrate 40. FIG. 4 is a plan view of the optical module 30 viewed from above a second surface 42 of the substrate 40. FIG. 5 is a cross-sectional view when the optical module 30 is cut along line V-V indicated in FIG. 3. FIG. 6 is an enlarged view of a part surrounded by a dotted line A indicated in FIG. 5. The optical module 30 includes the substrate 40, a plurality of lens modules 50, a plurality of optical elements 60, and a plurality of ICs 61.

The substrate 40 is a plate-shaped member in which various kinds of optical elements and electronic elements are mounted. The substrate 40 has a first end surface **40*a* and a second end surface 40*b* facing each other in the direction Y, and it may be a thin substrate having a thickness of 0.2 mm to 0.8 mm, for example. Various kinds of wirings (not illustrated) for electrically connecting the ICs, the electronic elements, and the like are provided on an inward side of the substrate 40. Hereinafter, an end portion where the first end surface 40*a* is positioned in the direction Y may be regarded as a tip of the optical module 30, and an end portion where the second end surface 40*b* is positioned may be regarded as a base end of the optical module 30. The substrate 40 has the first surface 41 and the second surface 42 facing each other in the direction Z. Hereinafter, a surface where the first surface 41 is positioned in the direction Z will be regarded as an upper surface of the optical module 30, and a surface where the second surface 42 is positioned will be regarded as a lower surface of the optical module 30**.

As illustrated in FIG. 3, the first surface 41 of the substrate 40 is a surface extending in the direction X and the direction Y and is formed to have a rectangular shape in a plan view. A plurality of patterns **41*a* (metal film) are provided in a region near the first end surface 40*a* on the first surface 41. Meanwhile, the plurality of lens modules 50 are placed side by side in the direction X in a region near the second end surface 40*b* on the first surface 41**.

As illustrated in FIG. 4, the second surface 42 of the substrate 40 is a surface extending in the direction X and the direction Y and is formed to have a rectangular shape in a plan view. The plurality of optical elements 60 and the plurality of ICs 61 are mounted in a region near the second end surface **40*b* on the second surface 42. In the present embodiment, for the sake of convenience of description, each of the optical elements 60 is indicated by a dotted line. For example, each of the optical elements 60 is a light receiving element such as a photodiode (PD). Each of the optical elements 60 overlaps each penetration hole 48*a*, which is provided in the substrate 40, in the thickness direction of the substrate 40 (direction Z) such that a light reception surface faces the lens module 50. Accordingly, the optical element 60 can receive light from the lens module 50 facing it with the substrate 40 interposed therebetween through the penetration hole 48*a*. The optical element 60 may be a light emitting element such as a vertical cavity surface emitting laser (VCSEL). In order to dispose the optical element 60 on the second surface 42, the opening area of the penetration hole 48*a* on the second surface 42 is formed to be smaller than the surface area of the optical element 60. Each of the ICs 61 is an integrated circuit for controlling operation of the optical element 60. For example, each of the ICs 61 may be connected to the optical element 60 through a wiring, a bonding wire, and the like inside the substrate 40. In the present embodiment, one IC 61 is connected to three optical elements 60. A high communication speed between the IC 61 and the optical element 60 can be maintained by disposing the IC 61 close to (for example, by disposing it adjacent to) the optical element 60**.

The lens module 50 is a component for optically coupling the optical fibers 11 and the optical element 60. The lens module 50 is formed of a material allowing light emitted from the optical fibers 11 to be transmitted therethrough (for example, a glass or a light transmitting resin). As illustrated in FIG. 5, the lens module 50 reflects light L emitted from the optical fibers 11 in the direction Y using a mirror 55 provided therein and converts a propagation direction of the light L into a direction in the direction Z. For example, the mirror 55 reflects the incident light L in a direction at 90 degrees with respect to the incidence direction. The light L reflected by the mirror 55 is incident on the optical element 60 through the penetration hole 48*a* provided in the substrate 40. The lens module 50 has a groove portion 51 (outer surface), an upper surface 52 (outer surface), a lower surface 53 (inner surface), an abutting surface 54, the mirror 55, and a lens 56.

The groove portion 51 is V-grooves each extending in the direction Y (each groove having a V-shape in an XZ plane) and is a holding portion for holding the end portions of the optical fibers 11. The groove portion 51 regulates positions of the optical fibers 11 with respect to the lens module 50 and prevents positional misalignment of the optical fibers 11 in the direction X. The end portions of the optical fibers 11 placed in the groove portion 51 are fixed to the groove portion 51, for example, using an adhesive. For example, the adhesive may be a UV curable adhesive or may be a light transmitting adhesive allowing light L emitted from the optical fibers 11 to be transmitted therethrough. The shape of the groove portion 51 is not limited to the V-groove. For example, it may be a U-groove having a rounded bottom portion or may be a rectangular groove having a bottom surface extending in the direction X and the direction Y. The holding portion (in the present embodiment, the groove portion 51) for holding the end portions of the optical fibers 11 may not necessarily be provided in the lens module 50. For example, the groove portion 51 may be provided in another component different from the lens module 50. At this time, for example, the lens module 50 may have a pair of projecting portions and another component provided with the groove portion 51 may have a pair of recessed portions. The components may be connected to each other by fitting the projecting portions of the lens module 50 into the recessed portions of another component.

The upper surface 52 is a surface positioned in an upper portion of the lens module 50 and extends in the direction X and the direction Y. The upper surface 52 is positioned near the tip of the lens module 50 (the right side in FIG. 5) from the groove portion 51. The upper surface 52 is provided with a depression having the mirror 55. The lower surface 53 is a surface positioned in a lower portion of the lens module 50 and extends in the direction X and the direction Y. A great part of the lower surface 53 faces the groove portion 51 and the upper surface 52 in the direction Z.

The abutting surface 54 is a surface which tip surfaces of the optical fibers 11 abut and extends in the direction X and the direction Z. The abutting surface 54 is provided such that the end portion of the groove portion 51 and the end portion of the upper surface 52 are connected. The light L emitted from the optical fibers 11 passes through the abutting surface 54 and is incident on the mirror 55. The abutting surface 54 and the tip surfaces of the optical fibers 11 may not come into direct contact with each other and may be fixed to each other with a light transmitting adhesive allowing the light L to be transmitted therethrough or a refractive index matching agent therebetween.

The mirror 55 is a member converting the propagation direction of the light L emitted from the optical fibers 11. The mirror 55 is provided in a manner of being inclined with respect to each of an XY plane and an XZ plane. The mirror 55 receives the light L emitted from the optical fibers 11 in the direction Y and reflects the light L toward the lens 56. An incidence optical axis and a reflection optical axis of the light L may form a right angle, for example.

The lens 56 is a member optically coupled to the optical element 60. The lens 56 is provided in a part protruding to the lower side in the lens module 50. As illustrated in FIG. 6, the lens 56 faces the optical element 60 in the direction Z and has a surface curved in a projecting shape toward the optical element 60. A focus F of the lens 56 is positioned on the inner side from the surface of the optical element 60. The lens 56 converges the light L reflected by the mirror 55 and causes it to be incident on the optical element 60. Various kinds of parameters of the lens 56 (for example, the surface shape, the size, the material, and the like of the lens 56) are optimized such that the focus F of the lens 56 is positioned inside the optical element 60.

Figure 7:
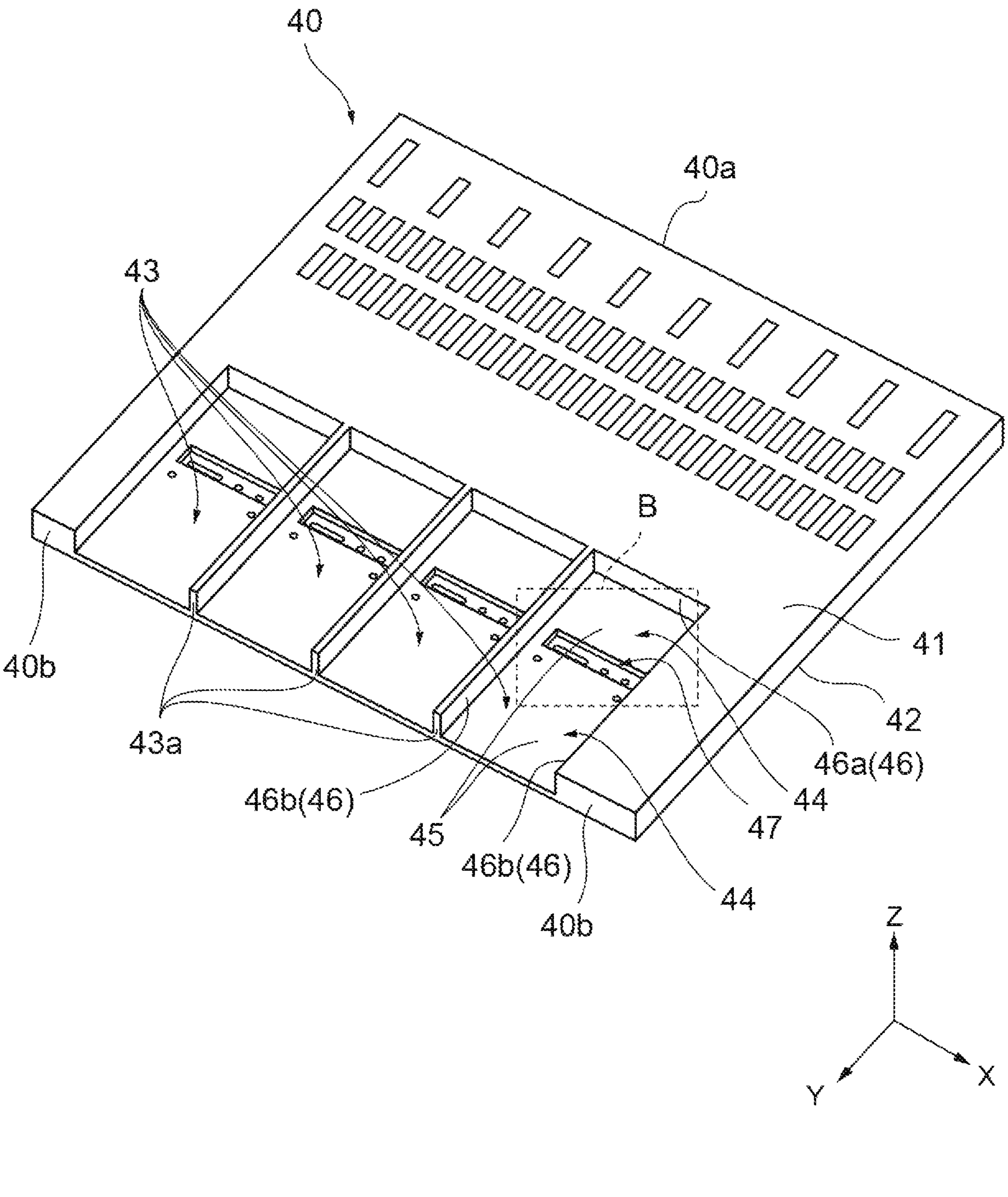
FIG. 7 is a perspective view illustrating the substrate used in the optical module illustrated in FIG. 3.
Figure 8:
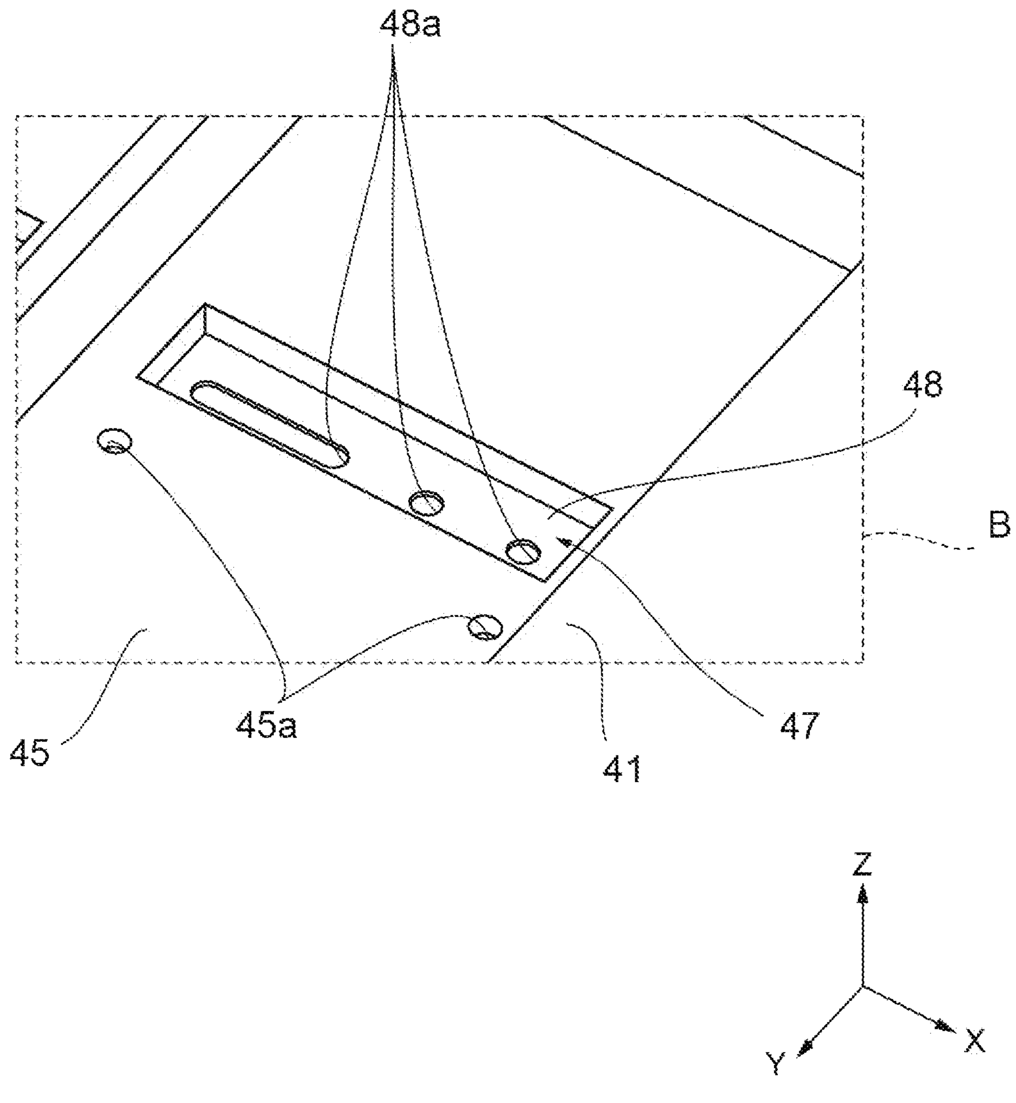
FIG. 8 is an enlarged view of a part surrounded by a dotted line B indicated in FIG. 7.

Next, with reference to FIGS. 7 and 8, a detailed constitution of the substrate 40 will be described. FIG. 7 is a perspective view illustrating the substrate 40. FIG. 8 is an enlarged view of a part surrounded by a dotted line B indicated in FIG. 7. As illustrated in FIG. 7, the substrate 40 is provided with a plurality of cavities 43. Each of the cavities 43 is a depression recessed from the first surface 41 toward the second surface 42, and the lens module 50 is accommodated inside each of them. The plurality of cavities 43 are provided side by side in the direction X. The number of cavities 43 may be the same as or larger than the number of lens modules 50 mounted in the substrate 40. In the present embodiment, the same number (four) of cavities 43 as the number of lens modules 50 are provided. For example, each of the cavities 43 may be formed by counterboring. A beam portion 43*a* extending from the inside to the outside of the substrate 40 in the direction Y is provided between the cavities 43 adjacent to each other. The beam portion 43*a* has a shape rising from a first bottom portion 45 of each of the cavities 43 toward the first surface 41 of the substrate 40.

Each of the cavities 43 includes a first cavity 44 and a second cavity 47. The first cavity 44 is a depression constituting a great part of the cavity 43 and has the first bottom portion 45 and wall surfaces 46. The first bottom portion 45 is a part where the lens module 50 is placed, and, in the present embodiment, is a flat surface extending in the direction X and the direction Y. The first bottom portion 45 has a rectangular shape having long sides whose outer edges extend in the direction Y and has a size allowing the lens module 50 in its entirety to be placed. The lens module 50 being placed in the first bottom portion 45 includes not only a case where the lens module 50 is placed such that it comes into direct contact with the first bottom portion 45 but also a case where the lens module 50 is placed in the first bottom portion 45 with a member such as an adhesive therebetween.

As illustrated in FIG. 8, the first bottom portion 45 has a pair of positioning holes 45*a*. Each of the positioning holes

45*a* is a hole penetrating the first bottom portion 45 toward the second surface 42 (refer to FIG. 4). The pair of positioning holes 45*a* function as positioning mechanisms for the lens module 50 with respect to the cavity 43. For example, the pair of projecting portions corresponding to the pair of positioning holes 45*a* are provided in the lens module 50, and the lens 56 included in the lens module 50 (refer to FIG. 5) and the optical element 60 may be suitably optically coupled by placing the lens module 50 such that the projecting portions are fitted into the positioning holes 45*a*. The number of positioning holes 45*a* may be one. However, positioning of the lens module 50 can be more accurately performed by forming two or more positioning holes 45*a*. There is no need for each of the positioning holes 45*a* to penetrate the first bottom portion 45 to the second surface 42, and it may be a non-penetration hole having a bottom surface.

The form of the positioning mechanism used for positioning of the lens module 50 is not limited to the positioning holes 45*a*. For example, a form in which the lens 56 of the lens module 50 and the optical element 60 are suitably optically coupled by providing a mark in each of the first bottom portion 45 and the lens module 50 and placing the lens module 50 at a position where the marks overlap each other may be adopted. At this time, in order for the mark provided in the first bottom portion 45 to be able to be visually recognized through the lens module 50, the material of the lens module 50 may be a material allowing visible light to be transmitted therethrough (for example, a glass or a light transmitting resin).

As illustrated in FIG. 7, the wall surfaces 46 are surfaces rising from the outer edge of the first bottom portion 45 toward the first surface 41 of the substrate 40. The wall surfaces 46 include a first wall surface 46*a* and a pair of second wall surfaces 46*b*. The first wall surface 46*a* is a wall surface provided at the end portion near the first end surface 40*a* in the first cavity 44 and extends in the direction X and the direction Z. The first wall surface 46*a* faces the tip surface of the lens module 50 accommodated in the cavity 43. The first wall surface 46*a* may not come into contact with the lens module 50 accommodated in the cavity 43, and a gap may be provided between the first wall surface 46*a* and the lens module 50. Corner portions where the first wall surface 46*a* and the first bottom portion 45 meet may have an R-shape.

The pair of second wall surfaces 46*b* are wall surfaces facing each other in the direction X and extend in the direction Y and the direction Z. The second wall surfaces 46*b* face side surfaces of the lens module 50 accommodated in the cavity 43. The second wall surfaces 46*b* may not come into contact with the lens module 50 accommodated in the cavity 43, and gaps may be provided between the second wall surfaces 46*b* and the lens module 50. Corner portions where the second wall surfaces 46*b* and the first bottom portion 45 meet may have an R-shape. No wall surface is provided in the end portion near the second end surface 40*b* in the first cavity 44. That is, the cavity 43 opens on the second end surface 40*b*. Accordingly, the lens module 50 can be accommodated toward the inside of the cavity 43 through the opening. In a state where the lens module 50 is accommodated in the cavity 43, the optical fibers 11 connected to the lens module 50 can be drawn out to the outward side of the cavity 43 through the opening.

As illustrated in FIG. 8, the second cavity 47 is a depression provided in the first bottom portion 45 of the first cavity 44. The second cavity 47 is formed to extend in the direction X. The second cavity 47 has a second bottom portion 48 near the second surface 42 from the first bottom portion 45 of the first cavity 44. In the present embodiment, the second bottom portion 48 is a flat surface extending in the direction X and the direction Y. A part of the lens module 50 (a part protruding to the lower side in the direction Z) is placed in the second bottom portion 48 (refer to FIG. 5). A plurality of penetration holes 48*a* are provided in the second bottom portion 48. Two round holes and one long hole are provided as the penetration holes 48*a* for each second cavity 47. The number and the shape of the penetration holes 48*a* are not limited to this and may be suitably changed in accordance with the number or the shape of the optical element 60 (refer to FIG. 4) mounted on the second surface 42. As illustrated in the cross-sectional view of FIG. 6, the penetration hole 48*a* penetrates the second bottom portion 48 toward the second surface 42. The light L from the lens 56 toward the optical element 60 passes through the inside of the penetration hole 48*a*. The penetration hole 48*a* has a tapered shape in which the inner diameter decreases from the second bottom portion 48 toward the second surface 42. The inner diameter and the taper angle of the penetration hole 48*a* are optimized to a size not obstructing the course of the light L from the lens 56 toward the optical element 60. The penetration hole 48*a* may be a straight penetration hole having a uniform inner diameter size.

Figure 9:
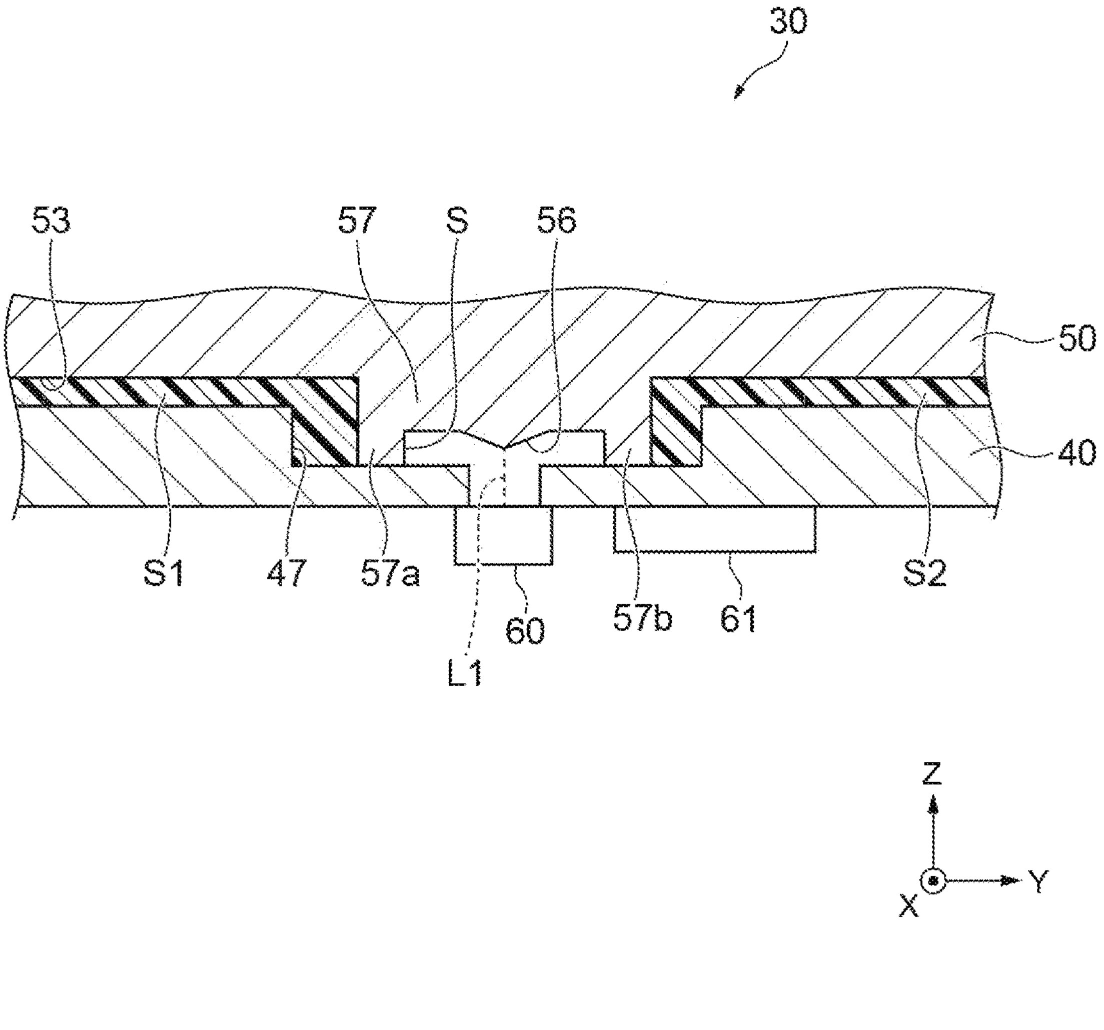
FIG. 9 is an enlarged view of a part surrounded by a dotted line C indicated in FIG. 5.

With reference to FIGS. 5 and 9, a form of accommodating the lens module 50 in the cavity 43 of the substrate 40 will be described. FIG. 9 is an enlarged view of a part surrounded by a dotted line C indicated in FIG. 5. As illustrated in FIGS. 5 and 9, a great part of the lens module 50 is accommodated in the first cavity 44, and a protruding portion 57 having the lens 56 provided therein (a part protruding to the lower side in the direction Z) is accommodated in the second cavity 47. In the present embodiment, the entire constitution of the lens module 50 is positioned on the substrate 40. However, the base end portion of the lens module 50 (the end portion on the left side in FIG. 5) may protrude to the outward side of the substrate 40. Adhesives S1 and S2 are provided between the lower surface 53 of the lens module 50 and the first bottom portion 45 of the first cavity 44, and therefore the lens module 50 is fixed to the cavity 43 of the substrate 40. For example, the adhesives S1 and S2 may be UV curable adhesives.

In regions between the substrate 40 and the lens module 50 and between the lens 56 and the adhesives S1 and S2, the protruding portion 57 has a first wall 57*a* (an inflow prevention structure, a first inflow prevention structure) and a second wall 57*b* (an inflow prevention structure, a second inflow prevention structure). Each of the tip of the first wall 57*a* and the tip of the second wall 57*b* abuts the second bottom portion 48 of the second cavity 47 (inflow prevention structure) that is a recessed portion and extends in the width direction in the direction X inside the second cavity 47. The first wall 57*a* and the second wall 57*b* may extend to the side surface of the second cavity 47 in the X direction. Due to such inflow prevention structures, the adhesives S1 and S2 which have been introduced between the substrate 40 and the lens module 50 do not flow into an optical axis L1 of the lens 56 so that a void S is secured. The first wall 57*a* and the second wall 57*b* are provided close to the lens 56. For example, the distance from the optical axis L1 of the lens to outer walls of the first wall 57*a* and the second wall 57*b* in the direction Y may be within 5 mm. The width of the gap in the Z direction between the substrate 40 and the lens module 50 into which the adhesives S1 and S2 are introduced may be equal to or less than 1 mm.

Parts of the optical fibers 11 (attachment parts) positioned in the substrate 40 extend along the first surface 41 of the substrate 40, and center axes thereof are positioned inside the cavity 43. Accordingly, the end portions of the optical fibers 11 extend straight without causing bending on the second end surface 40*b* of the substrate 40.

For example, a depth D1 of the first cavity 44 is optimized in accordance with the thickness or the like of the lens module 50. Here, the depth D1 of the first cavity 44 is a distance from the first surface 41 to the first bottom portion 45 in the thickness direction of the substrate 40 (direction Z). In the present embodiment, the depth D1 of the first cavity 44 is a size equivalent to half or larger than the thickness of the substrate 40 (a distance from the first surface 41 to the second surface 42). For example, when the thickness of the substrate 40 is 10, the depth D1 of the first cavity 44 may be 6 to 8.

The depth D1 of the first cavity 44 may be a size equivalent to half or larger than a thickness T of the lens module 50. Here, the thickness T of the lens module 50 is a distance from the upper surface 52 to the lower surface 53 in the direction Z. As the depth D1 of the first cavity 44 increases, more parts of the lens module 50 are accommodated in the cavity 43, and therefore the optical module 30 becomes thinner. In the present embodiment, the upper surface 52 of the lens module 50 is positioned outside the cavity 43 (a side above the first surface 41 of the substrate 40). However, the depth D1 of the first cavity 44 may be larger such that the upper surface 52 is positioned inside the cavity 43 (flush with the first surface 41 of the substrate 40 or on a side below the first surface 41).

A depth D2 of the second cavity 47 is larger than the depth D1 of the first cavity 44. Here, the depth D2 of the second cavity 47 is a distance from the first surface 41 to the second bottom portion 48 in the thickness direction of the substrate 40. For example, the depth D2 of the second cavity 47 may be optimized in accordance with the thickness or the like of the lens module 50. For example, when the thickness T of the substrate 40 is 10, the depth D2 of the second cavity 47 may be 7 to 9, for example.

Hereinabove, in the optical module 30 and the optical connector cable 1 according to the present embodiment, the first wall 57*a* and the second wall 57*b* which are inflow prevention structures for preventing inflow of the adhesives S1 and S2 to the optical axis L1 of the lens 56 are provided between the substrate 40 and the lens modules 50 and between the lenses 56 and the adhesives S1 and S2. Due to these inflow prevention structures, the adhesives S1 and S2 which have been introduced into the gaps between the lens modules 50 and the substrate 40 are prevented from flowing into the lenses 56 provided on the inner surfaces of the lens modules 50 so that the adhesives S1 and S2 do not obstruct optical paths of the lenses 56 for optical coupling between the optical fibers 11 and the optical elements 60. Thus, according to the optical module 30 and the optical connector cable 1, optical coupling between the optical fibers 11 and the optical elements 60 can be stably performed. The second cavity 47 can also function as the inflow prevention structure and can independently prevent inflow of the adhesives S1 and S2 when the amounts of the adhesives are small.

In the optical module 30 and the optical connector cable 1 according to the present embodiment, the widths of the gaps between the substrate 40 and the lower surfaces 53 of the lens modules 50 may be equal to or less than 1 mm, and the adhesives S1 and S2 may be introduced into these gaps. In this case, the substrate 40 and the lens modules 50 are attached to each other in a thinner manner, and therefore the optical module 30 and the like can be made thin. If the adhesives are introduced into such very small gaps, there is concern that the adhesives easily reach the inside. However, since the inflow prevention structures described above are provided in the optical module 30 according to the present embodiment, the adhesives are prevented from adhering on the optical axes L1 of the lenses 56, and therefore optical coupling between the optical fibers 11 and the optical elements 60 can be stably performed.

In the optical module 30 and the optical connector cable 1 according to the present embodiment, the first wall 57*a* and the second wall 57*b*, which are inflow prevention structures, may be provided in a region within 5 mm from the optical axis L1 of the lens 56 in the Y direction orthogonal to the optical axis L1. In this case, the amounts of the adhesives S1 and S2 introduced between the substrate 40 and the lens modules 50 are sufficiently secured, and the lens modules 50 can be attached to the substrate 40 more reliably.

In the optical module 30 and the optical connector cable 1 according to the present embodiment, the cavities 43 recessed in the thickness direction of the substrate 40 (direction Z) are provided, and at least parts of the lens modules 50 are accommodated inside the cavities 43. Accordingly, in the optical module 30, the thickness thereof is reduced by the amounts of the lens modules 50 accommodated in the cavities 43, and therefore the optical module 30 is made thin. According to this, the optical connector cable 1 including the optical module 30 is also made thin. In optical modules in the related art in which the cavities 43 are not provided in a substrate, lens modules are placed on a flat surface of the substrate. In this case, since there is a large gap between the heights of optical fibers extending on the outward side of the substrate and the heights of the end portions of the optical fibers mounted in the substrate, there is a need to significantly bend the optical fibers (a need to increase the curvature). Meanwhile, in the optical module 30 according to the present embodiment, since the lens modules 50 are accommodated inside the cavities 43 of the substrate 40, the heights of the optical fibers 11 mounted on the substrate 40 are lowered so that the gaps are reduced. Accordingly, moreover, in optical modules in the related art, as described above, the mounting positions of the optical fibers on the substrate are high. For this reason, when it is intended to reduce the bending by gently bending the optical fibers, disposition spaces of the optical fibers in an axial direction increase. Meanwhile, in the optical module 30 according to the present embodiment, since the mounting positions of the optical fibers 11 on the substrate 40 are lower than those of the examples in the related art, the disposition spaces of the optical fibers 11 in the axial direction can be reduced. Accordingly, miniaturization of the optical module 30 can be achieved.

Hereinabove, an embodiment of the present invention has been described in detail, but the present invention is not limited to the foregoing embodiment and can be applied to various embodiments. For example, in the foregoing embodiment, the lens modules 50 are configured to be placed in the cavities 43 provided in the substrate 40, but it is not limited to this. That is, as described in a first modification example, a second modification example, and a third modification example below, the present invention may be applied to a constitution in which the lens modules 50 are placed on a surface of the substrate without any change.

First Modification Example

Figure 10:
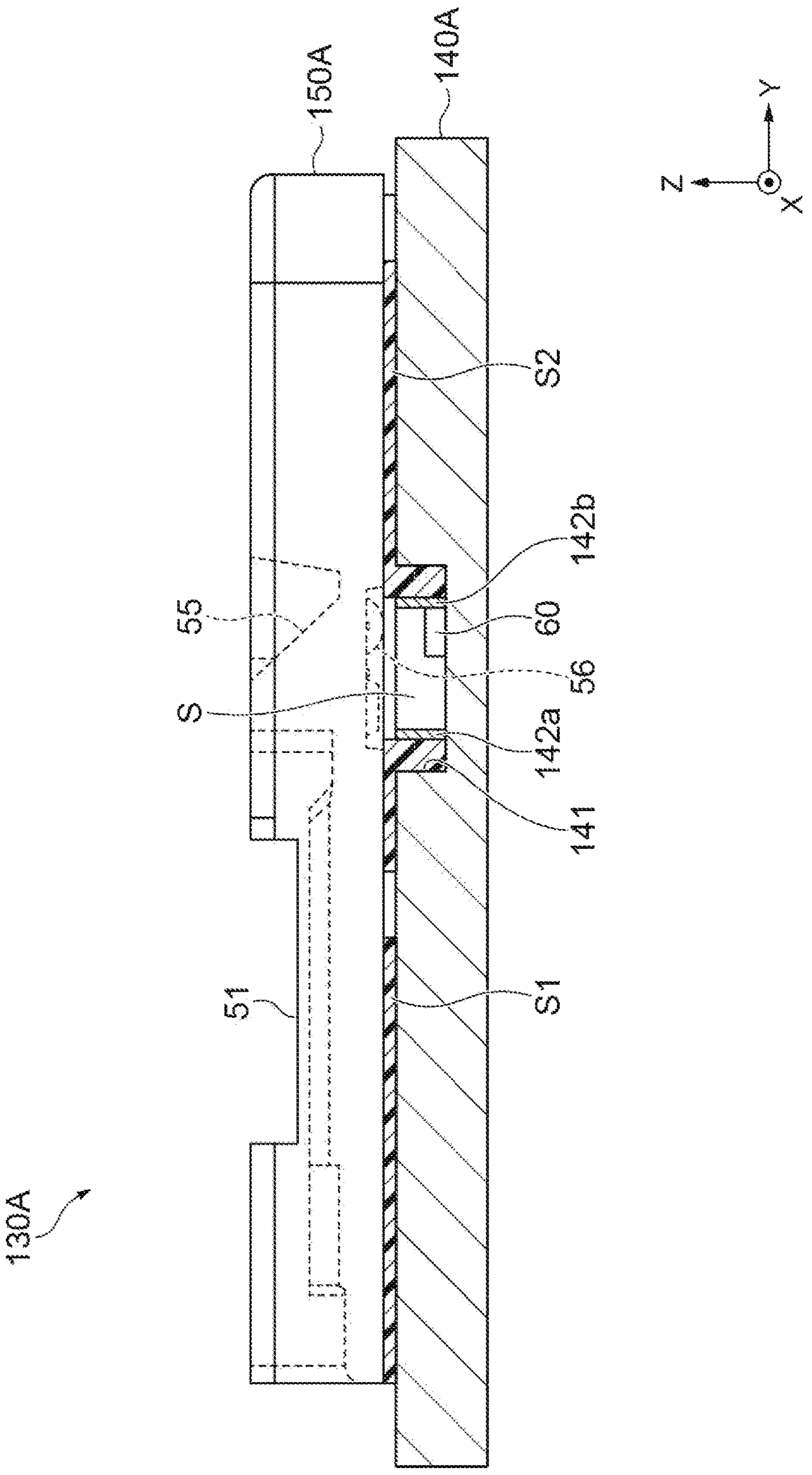
FIG. 10 is a schematic view of a part of a cross section illustrating a constitution of an optical module according to a first modification example.

FIG. 10 is a view illustrating an optical module according to the first modification example. As illustrated in FIG. 10, in an optical module 130A according to the first modification example, a lens module 150A is placed on a surface of a substrate 140A. The substrate 140A is provided a recessed portion 141, and a first wall 142*a* and a second wall 142*b* (inflow prevention structures) are provided inside the recessed portion 141. That is, the first wall 142*a* and the second wall 142*b* which are inflow prevention structures for preventing inflow of the adhesives S1 and S2 to the optical axis L1 of the lens 56 are provided between the substrate 140A and the lens module 150A and between the lens 56 and the adhesives S1 and S2. The first wall 142*a* and the second wall 142*b* extend in the X direction. Meanwhile, unlike the lens module 50, the lens module 150A has no wall on the inner surface. The optical element 60 can be provided in the bottom portion of the recessed portion 141 and at a location facing the lens 56.

In this optical module 130A, due to the foregoing inflow prevention structures, the adhesives S1 and S2 which have been introduced into the gap between the lens module 150A and the substrate 140A are prevented from flowing into the lens 56 provided on the inner surface of the lens module 150A. Thus, the adhesives S1 and S2 do not obstruct the optical path of the lens 56 for optical coupling between the optical fibers 11 and the optical element 60. Therefore, according to the optical module 130A of the first modification example and the optical connector cable 1 including the optical module 130A, optical coupling between the optical fibers 11 and the optical element 60 can be stably performed. In the first modification example, grooves extending in the X direction are formed by the recessed portion 141, the first wall 142*a*, and the second wall 142*b* and function as the inflow prevention structures.

Second Modification Example

Figure 11:
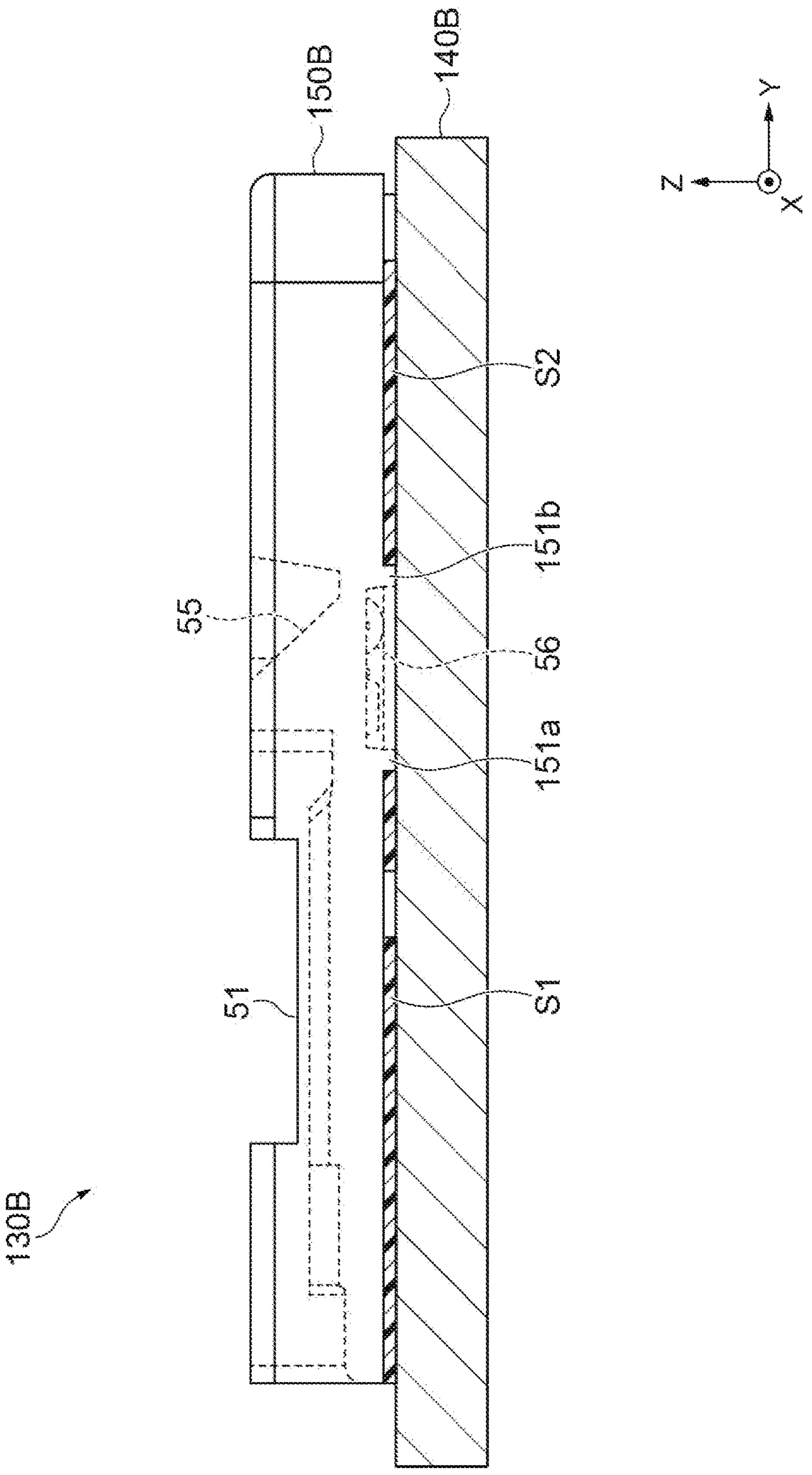
FIG. 11 is a schematic view of a part of a cross section illustrating a constitution of an optical module according to a second modification example.

FIG. 11 is a view illustrating an optical module according to the second modification example. As illustrated in FIG. 11, in an optical module 130B according to the second modification example, a lens module 150B is placed on a surface of a substrate 140B. A recessed portion or the like is not provided in the substrate 140B. Meanwhile, in the lens module 150B, a first wall 151*a* and a second wall 151*b* (inflow prevention structures) are provided on the inner surface. That is, the first wall 151*a* and the second wall 151*b* which are inflow prevention structures for preventing inflow of the adhesives S1 and S2 to the optical axis L1 of the lens 56 are provided between the substrate 140B and the lens module 150B and between the lens 56 and the adhesives S1 and S2. The first wall 151*a* and the second wall 151*b* extend in the X direction. The optical element 60 may be provided on a second surface of the substrate 140B as in the optical module 30. However, it may be provided on the first surface (inner surface) facing the lens module 150B.

In this optical module 130B, due to the foregoing inflow prevention structures, the adhesives S1 and S2 which have been introduced into the gap between the lens module 150B and the substrate 140B are prevented from flowing into the lens 56 provided on the inner surface of the lens module 150B. Thus, the adhesives S1 and S2 do not obstruct the optical path of the lens 56 for optical coupling between the optical fibers 11 and the optical element 60. Therefore, according to the optical module 130B of the second modification example and the optical connector cable 1 including the optical module 130B, optical coupling between the optical fibers 11 and the optical element 60 can be stably performed.

Third Modification Example

Figure 12:
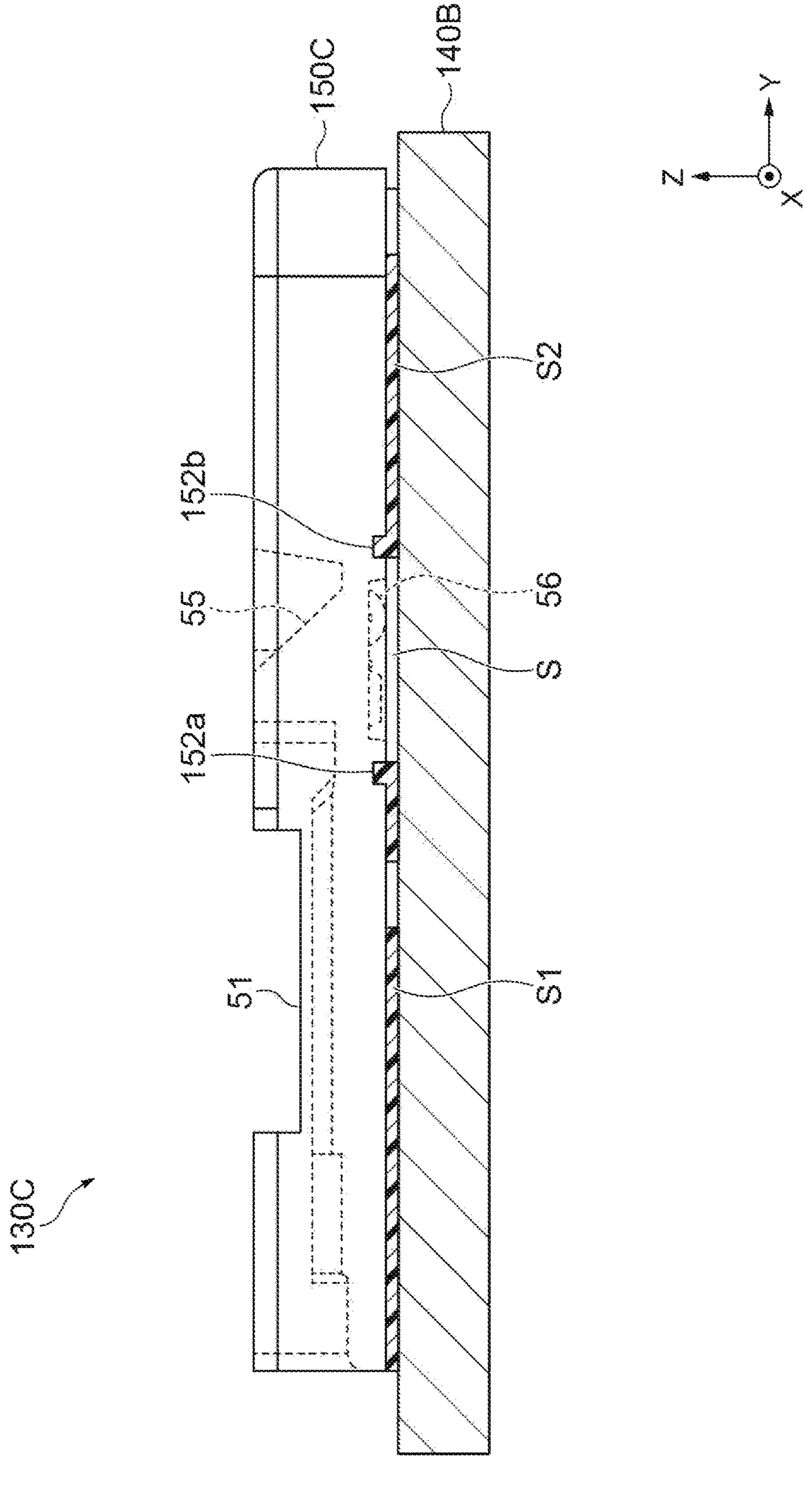
FIG. 12 is a schematic view of a part of a cross section illustrating a constitution of an optical module according to a third modification example.
Figure 13A:
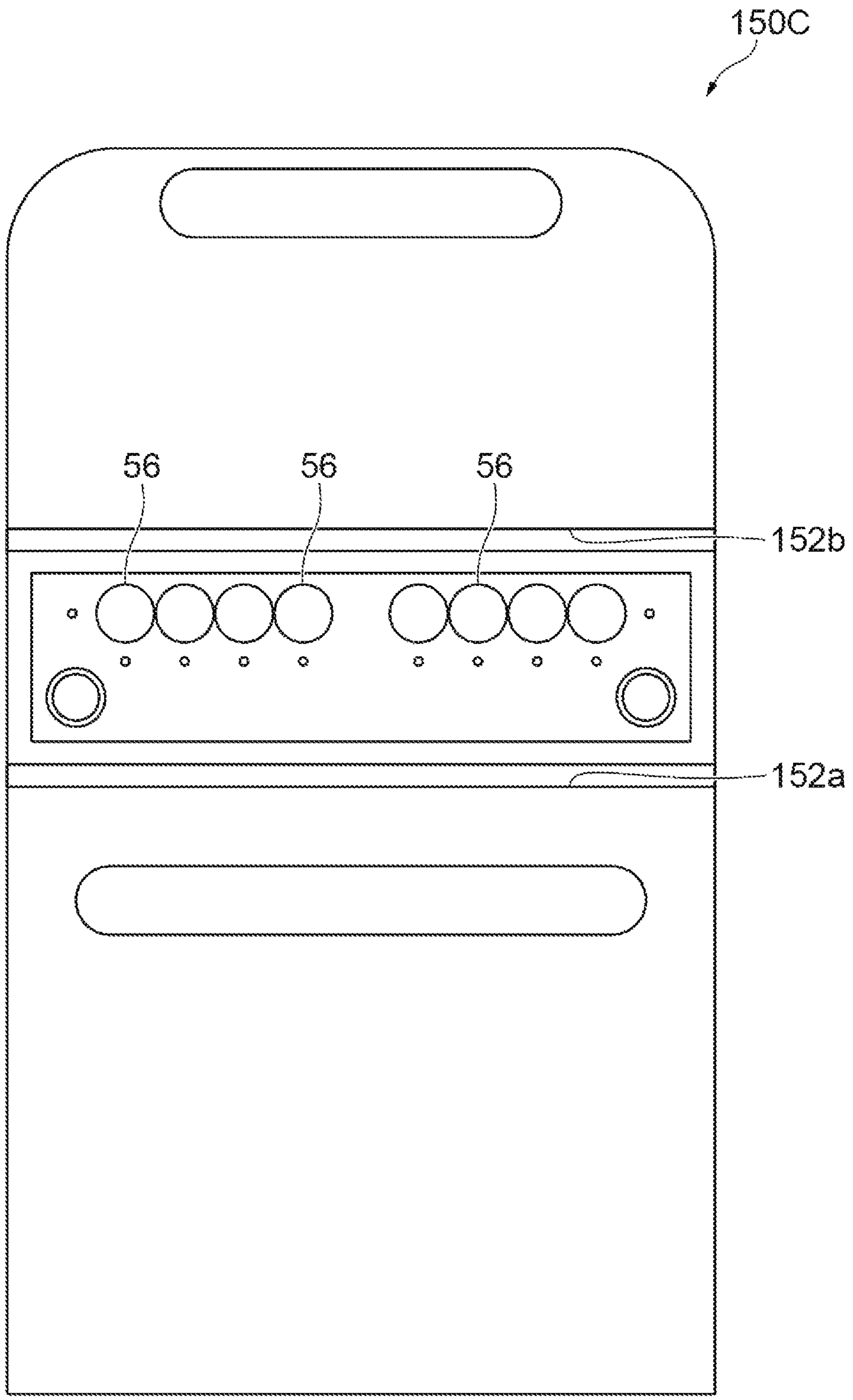
FIG. 13A is a plan view illustrating an example of an inner surface of a lens module used in the third modification example.
Figure 13B:
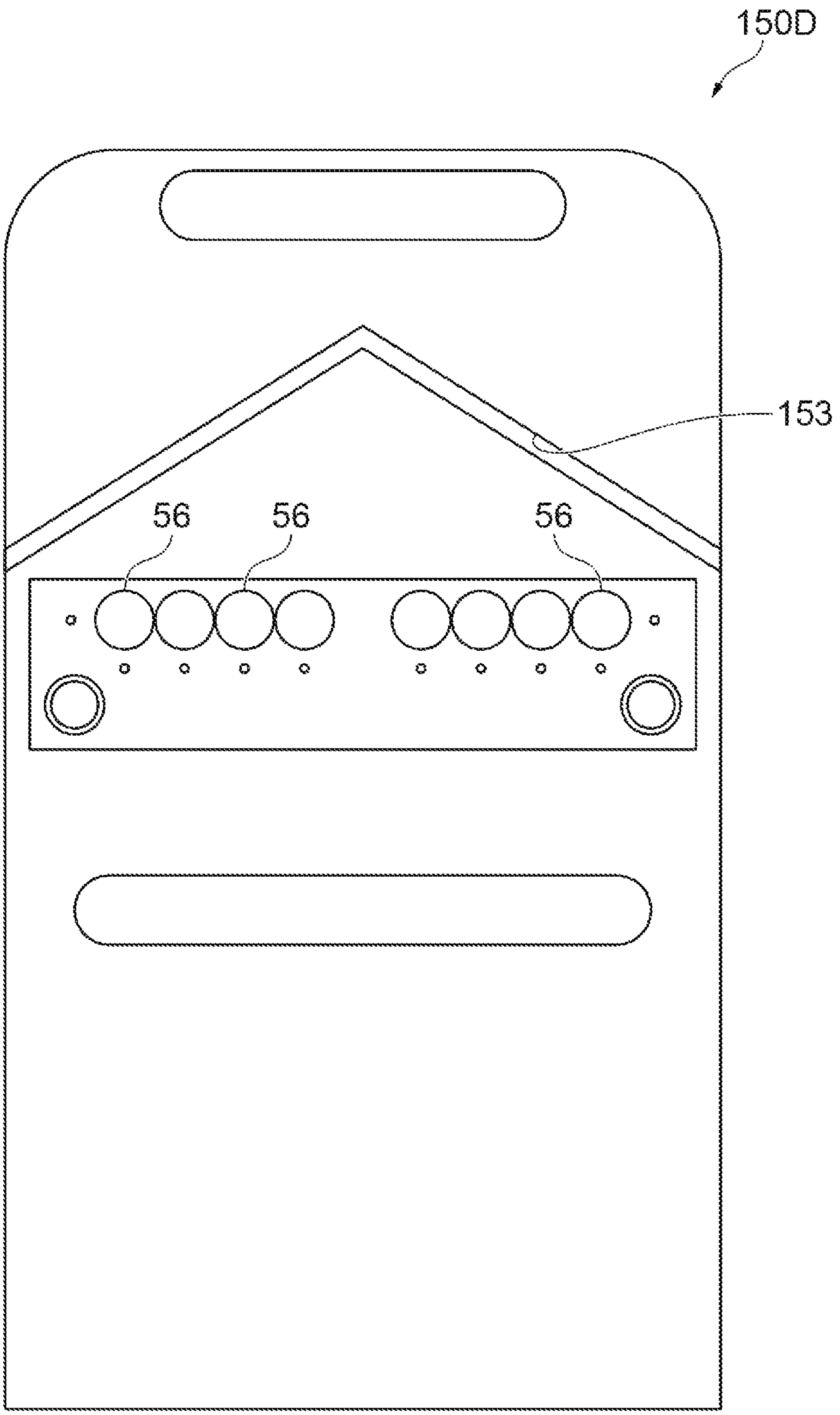
FIG. 13B is a plan view illustrating another example of the inner surface of the lens module used in the third modification example.
Figure 13C:
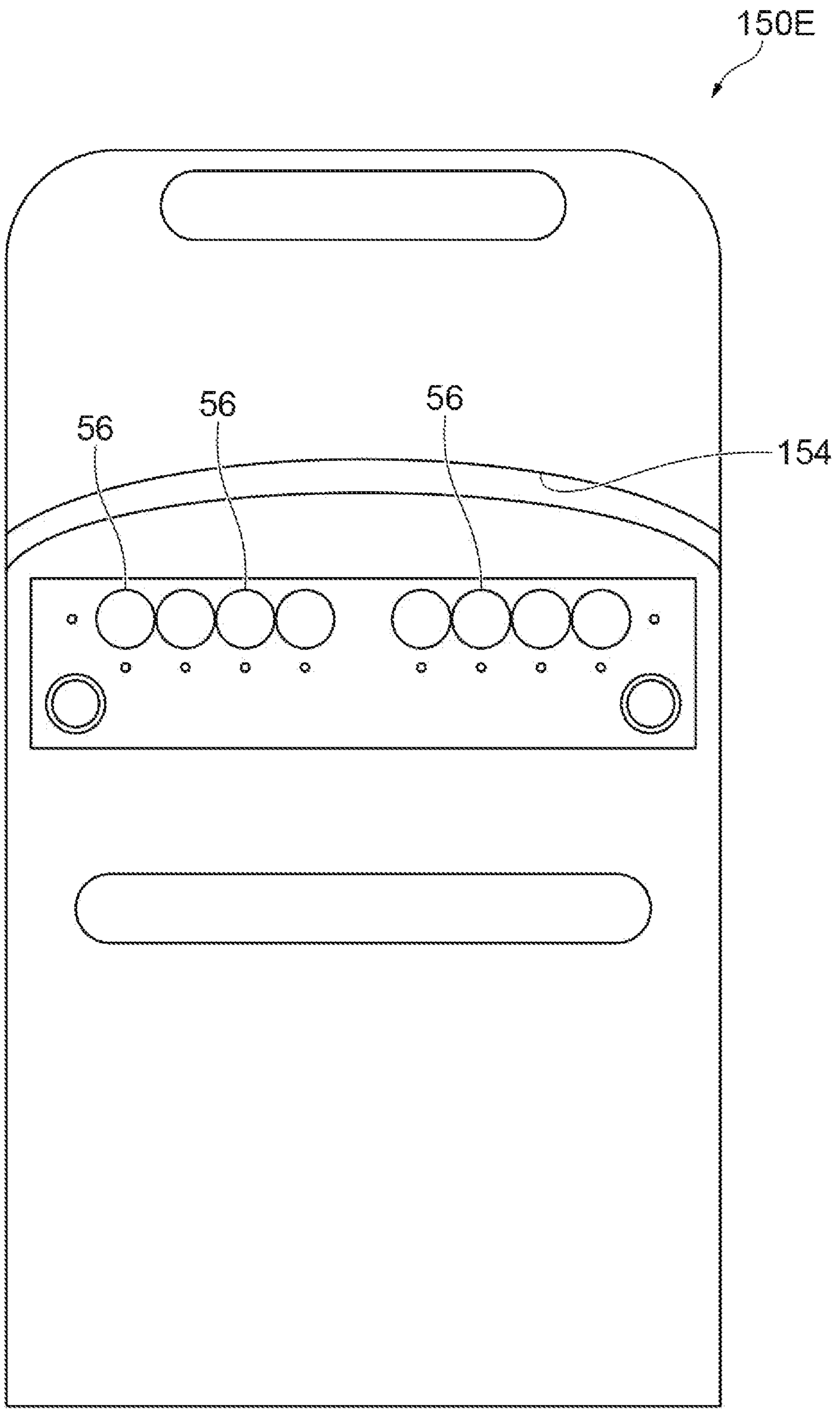
FIG. 13C is a plan view illustrating still another example of the inner surface of the lens module used in the third modification example.

FIG. 12 is a view illustrating an optical module according to the third modification example. FIG. 13A is a plan view illustrating an example of an inner surface of a lens module used in the third modification example. FIG. 13B is a plan view illustrating another example of the inner surface of the lens module used in the third modification example. FIG. 13C is a plan view illustrating still another example of the inner surface of the lens module used in the third modification example. As illustrated in FIGS. 12 and 13A, in an optical module 130C according to the third modification example, a lens module 150C is placed on the surface of the substrate 140B. Similarly to the second modification example, a recessed or the like is not provided in the substrate 140B. Meanwhile, in the lens module 150C, a first guide groove 152*a* and a second guide groove 152*b* (inflow prevention structures) are provided on the inner surface. That is, the first guide groove 152*a* and the second guide groove 152*b* which are inflow prevention structures for preventing inflow of the adhesives S1 and S2 to the optical axis L1 of the lens 56 are provided between the substrate 140B and the lens module 150C and between the lens 56 and the adhesives S1 and S2. The first guide groove 152*a* and the second guide groove 152*b* extend in the X direction. The optical element 60 may be provided on the second surface of the substrate 140B as in the optical module 30. However, it may be provided on the first surface (inner surface) facing the lens module 150C.

In this optical module 130C, due to the foregoing inflow prevention structures, the adhesives S1 and S2 which have been introduced into the gap between the lens module 150C and the substrate 140B are prevented from flowing into the lens 56 provided on the inner surface of the lens module 150C. Thus, the adhesives S1 and S2 do not obstruct the optical path of the lens 56 for optical coupling between the optical fibers 11 and the optical element 60. Therefore, according to the optical module 130C of the third modification example and the optical connector cable 1 including the optical module 130C, optical coupling between the optical fibers 11 and the optical element 60 can be stably performed.

In the optical module 130C according to the third modification example, the guide grooves provided in the lens module are not limited to the structure illustrated in FIG. 13A and may have structures illustrated in FIG. 13B and FIG. 13C. That is, as illustrated in FIG. 13B, a guide groove 153 of a lens module 150D may have a shape constituting two sides of a triangular shape. In addition, as illustrated in FIG. 13C, a guide groove 154 of a lens module 150E may have a convex curved surface shape.

Any of the optical modules according to foregoing embodiment and the first modification example to the third modification example has a constitution in which the light L emitted from the optical fibers 11 is incident on the optical elements 60. However, a constitution in which light emitted from the optical elements 60 is incident on the optical fibers 11 may be adopted. At this time, the optical elements 60 may be light emitting elements such as vertical cavity surface emitting laser (VCSEL). Light emitted from the optical elements 60 may be converted into collimated light (parallel light) by the lenses 56, may be reflected by the mirrors 55, and then may be incident on the optical fibers 11.

REFERENCE SIGNS LIST

1 Optical connector cable
10 Optical fiber cable

11 Optical fiber
12 Cable sheath
20 Protective member
21 Inner layer
22 Outer layer
30, 130A, 130B, 130C Optical module
40, 140A, 140B Substrate
40*a* First end surface
40*b* Second end surface
41 First surface
41*a* Pattern
42 Second surface
43 Cavity
43*a* Beam portion
44 First cavity
45 First bottom portion
45*a* Positioning hole
46 Wall surface
46*a* First wall surface
46*b* Second wall surface
47 Second cavity
48 Second bottom portion
48*a* Penetration hole
50, 150A, 150B, 150C, 150D, 150E Lens module
51 Groove portion
52 Upper surface
53 Lower surface
54 Abutting surface
55 Mirror
56 Lens
57 Protruding portion
57*a*, 142*a*, 151*a* First wall
57*b*, 142*b*, 151*b* Second wall
60 Optical element
61 IC
141 Recessed portion
152*a* First guide groove
152*b* Second guide groove
153, 154 Guide groove
A, B, C Dotted line
D1, D2 Depth
F Focus
L Light
L1 Optical axis
S Void
S1, S2 Adhesive
T Thickness
X, Y, Z Direction

The invention claimed is:

1. An optical module comprising:
a substrate;
an optical element mounted on the substrate; and
a lens module including an outer surface and an inner surface facing each other and a lens provided on the inner surface so as to be optically coupled to the optical element, the lens module optically coupling an optical fiber with the optical element through the lens,
wherein the lens module is mounted on the substrate such that the inner surface faces the substrate and is attached to the substrate with an adhesive introduced into a gap between the inner surface and the substrate, and
an inflow prevention structure that prevents inflow of the adhesive to an optical axis of the lens is provided between the substrate and the lens module and between the lens and the adhesive,
wherein a cavity recessed from a first surface of the substrate toward a second surface of the substrate so as to have a bottom portion is formed in the substrate, and at least a part of the lens module is accommodated in the cavity,
the cavity includes a first cavity having a first bottom portion and a second cavity having a second bottom portion,
a distance between the second bottom portion and the second surface is smaller than a distance between the first bottom portion and the second surface, and
the lens is accommodated in the second cavity.

2. The optical module according to claim 1,
wherein the inflow prevention structure includes a groove or a recessed portion provided on a surface of the substrate facing the lens module and close to a region facing the lens.

3. The optical module according to claim 1,
wherein the inflow prevention structure includes a wall provided on the inner surface of the lens module and between the lens and the adhesive.

4. The optical module according to claim 3,
wherein the wall abuts the substrate when the lens module is attached to the substrate with the adhesive.

5. The optical module according to claim 3,
wherein the wall extends in a width direction intersecting a longitudinal direction in a surface direction of the lens module.

6. The optical module according to claim 1,
wherein the inflow prevention structure includes a guide groove provided on the inner surface of the lens module and between the lens and the adhesive.

7. The optical module according to claim 6,
wherein the guide groove extends in a width direction intersecting a longitudinal direction in a surface direction of the lens module.

8. The optical module according to claim 1,
wherein a width of the gap between the substrate and the inner surface of the lens module is equal to or less than 1 mm, and the adhesive is introduced into the gap.

9. The optical module according to claim 1,
wherein the inflow prevention structure is provided in a region within 5 mm from the optical axis of the lens in a surface direction orthogonal to the optical axis.

10. The optical module according to claim 1,
wherein the inflow prevention structure includes a first inflow prevention structure and a second inflow prevention structure, and
the first inflow prevention structure is disposed on one side of the lens, and the second inflow prevention structure is disposed on the other side of the lens.

11. The optical module according to claim 1,
wherein the inflow prevention structure is accommodated in the second cavity.

12. The optical module according to claim 1,
wherein the lens module includes a mirror converting a propagation direction of light such that light emitted from the optical fiber mounted on the outer surface is incident on the optical element or light emitted from the optical element is incident on the optical fiber mounted on the outer surface.

13. An optical connector cable comprising:
the optical module according to claim 1; and
an optical fiber cable having at least one optical fiber,
wherein the optical fiber cable is attached to the optical module such that the optical fiber is optically coupled to the optical element through the lens.

14. An optical module comprising:
a substrate;

a plurality of optical elements mounted on the substrate; and a plurality of lens modules each having an outer surface and an inner surface facing each other and a lens provided on the inner surface, the plurality of lens modules optically coupling optical fibers and the plurality of optical elements through each lens, respectively, wherein each of the plurality of lens modules is mounted on the substrate such that the inner surface faces the substrate and is attached to the substrate with an adhesive introduced into a gap between the inner surface and the substrate, and an inflow prevention structure that prevents inflow of the adhesive to an optical axis of the lens is provided between the substrate and each of the plurality of lens modules and between the lens and the adhesive, wherein a plurality of cavities, each of which is recessed from a first surface of the substrate toward a second surface of the substrate so as to have a bottom portion, are formed in the substrate, and at least a part of each of the plurality of lens modules is accommodated in a corresponding one of the plurality of cavities, each of the plurality of cavities includes a first cavity having a first bottom portion and a second cavity having a second bottom portion, a distance between the second bottom portion and the second surface is smaller than a distance between the first bottom portion and the second surface, and the lens of each of the plurality of lens modules is accommodated in the second cavity of the corresponding one of the plurality of cavities.

* * * * *